Oct. 27, 1970     G. G. COCKS     3,536,384
APPARATUS FOR DETERMINING CORNEAL CURVATURE AND THE LIKE
Filed July 5, 1968     3 Sheets-Sheet 1
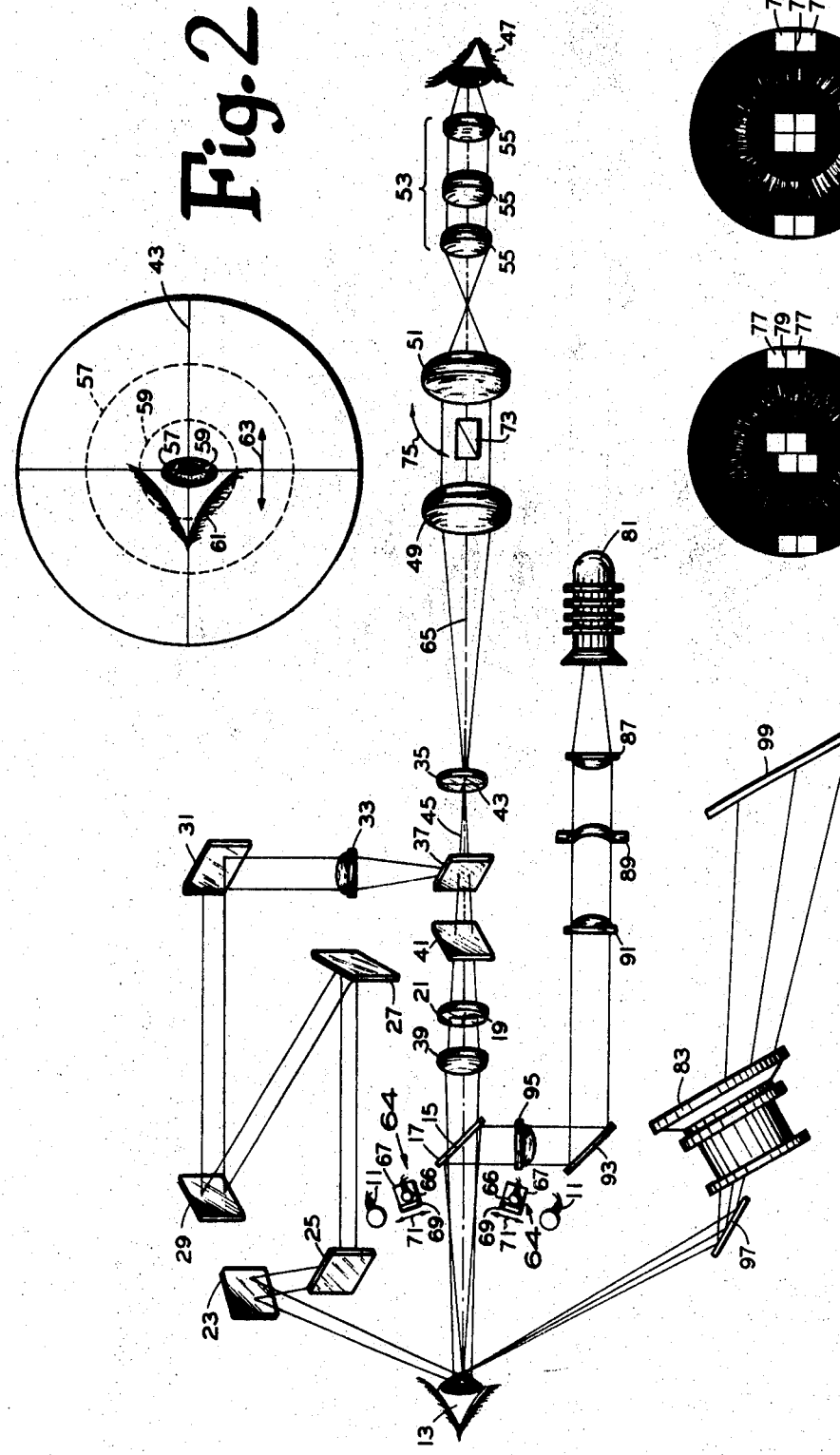
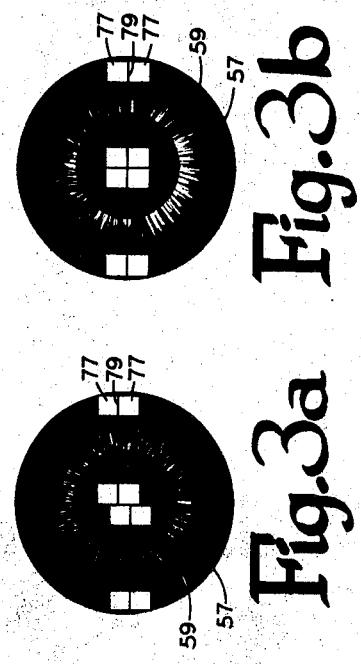

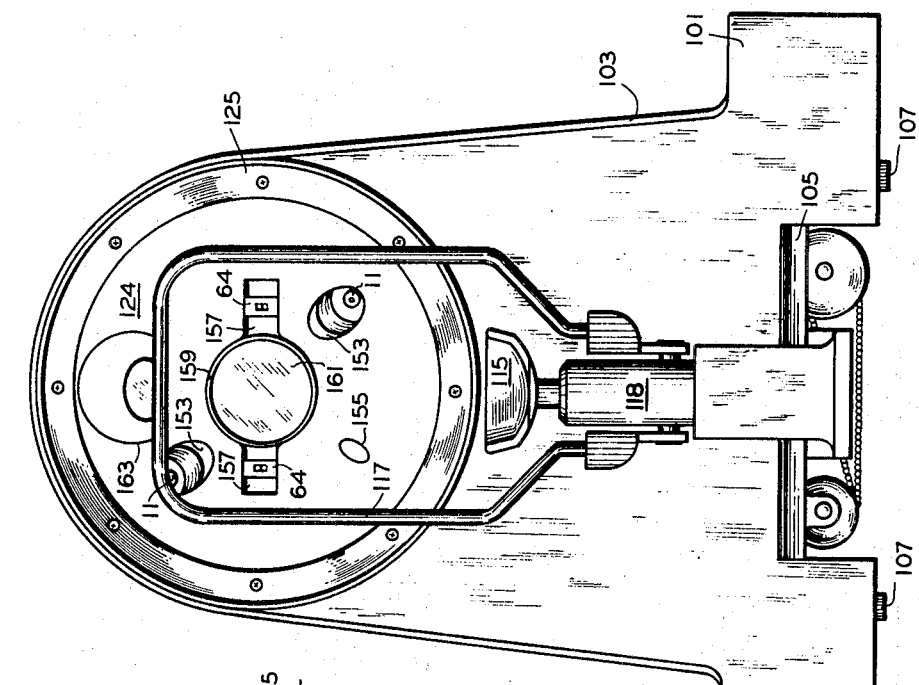
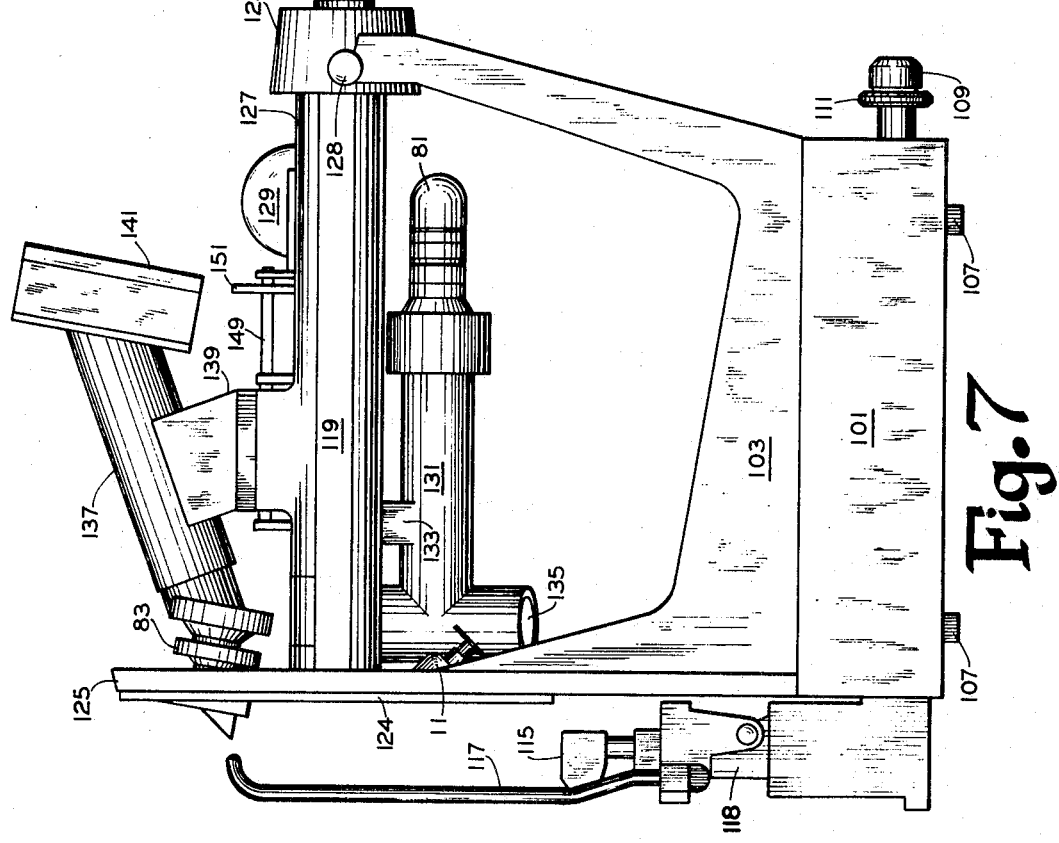

United States Patent Office 3,536,384
Patented Oct. 27, 1970

3,536,384
APPARATUS FOR DETERMINING CORNEAL CURVATURE AND THE LIKE
George G. Cocks, Ithaca, N.Y., assignor, by mesne assignments, to The Battelle Development Corporation, Columbus, Ohio, a corporation of Delaware
Continuation-in-part of application Ser. No. 446,508, Apr. 8, 1965. This application July 5, 1968, Ser. No. 742,588
Int. Cl. A61b 3/00, 3/10, 3/14
U.S. Cl. 351—6                                              6 Claims

ABSTRACT OF THE DISCLOSURE

An apparatus for perceiving, measuring, and recording the curvature of the surface of the cornea along any meridian preferably through or very nearly through the axis passing through the center of the eye and the pupil. Triangulation means are used to center the eye with respect to the recording and optical portion of the apparatus and to bring the cornea into sharp focus. Means are provided for determining the major and minor axes of the cornea to provide optimum information for making fitted contact lenses. A curved thin line is illuminated to form a curved focal plane which is projected onto the cornea and means for viewing and recording the illuminated contour of the corneal surface are included.

Cross reference to related application

This application is a continuation-in-part of co-pending United States patent application Ser. No. 446,508 now abandoned, filed Apr. 8, 1965, entitled "Apparatus for Determining Corneal Curvature and the Like."

Background of the invention

This invention relates to an apparatus for examining the eye in preparation for fitting contact lenses. More particularly it concerns apparatus for measuring and recording the contour of the cornea and the like. Preferably means are included for determining the major and minor axes of the cornea and the curvature along these axes are recorded and measured.

The cornea has a central zone of about 4 to 5 mm. in diameter that is essentially spherical. The spherical zone is surrounded by a peripheral zone that usually flattens like a parabola. It is also suggested that most corneas have an intermediate zone between the central and peripheral zones with less curvature than either the central or peripheral zone. The radius of curvature of the various corneal zones varies with each individual. To provide properly fitting contact lenses, all of these compound curves should be carefully measured and, in general, they are not all measured at the present time. The more accurately the curves are measured, the better is the chance that the contact lenses will fit properly and thereby decrease problems of adaptation to wearing the contact lenses.

The ophthalmometer has long been used to measure the curvature of the cornea. Contemporary types of ophthalmometers are designed to measure only the central portion of the cornea where the usual curvature is that of a true sphere. The ophthalmometer measures a zone which varies from 3 to 3.5 mm. in width. If the curvature of the measured zone is not constant, an error is introduced into the ophthalmometer reading. When measurements are attempted in the intermediate or peripheral zone, where the curvature of the cornea varies rapidly, there is considerable error.

Conventionally, instruments for measuring corneal curvature depend on reflections of targets, called mires, from the surface of the cornea. Several mires are selectively placed to reflect through an eyepiece and adjustment of the reflected images produces a reading concerning the corneal curvature. Measurements in the peripheral zone are accomplished by having the individual fix his eye on various targets positioned on and off the axis of the eyepiece thereby presenting portions of the peripheral zone to the eyepiece for measurement. The difficulty of consistently obtaining accurate measurements of the cornea is indicated by the fact that many persons engaged in the practice of fitting contact lenses have a set of fitting lenses that are applied to the patient's eyes to aid in determining the shape of the final lenses. A dye that fluoresces upon exposure to properly selected light is inserted beneath the fitting lenses and the heavy deposits of the dye indicate the spaces beneath the lenses. This process may be repeated, if necessary, with the final lenses that are ground for the patient to aid in determining the degree of error, if any, in the fit.

Summary of the invention

The present invention allows the person examining the eye to, in a sense, directly view the cornea and make curvature measurements at any point on the cornea. In the preferred embodiment of the invention, an enlarged image of the cornea is obtained for measurements. In its simplest form, the invention includes projecting a curved line onto the cornea that substantially matches the curvature of the "average" eye. The curved line illuminates the surface of the cornear along a selected meridian of the cornea (a meridian in the sense that the pupil would be a pole of the eye sphere). The image produced is a light curved line on a dark background and represents the corneal surface along the selected meridian. An enlarged record, preferably in the form of a photograph, is made of the illuminated corneal surface suitable for supplying information to grind contact lenses. The eye is properly positioned and brought into focus for all the optical systems of the apparatus by triangulation methods. An axis locater is included to determine the major and minor axes as the apparatus is rotated around an axis perpendicular to the eye at the center of the pupil. The curvature at these portions is photographed by an optical system that produces an enlarged image from the side.

One object of this invention is to provide an improved apparatus whereby the contour of the cornea of the eye, along any meridian, is accurately recorded and the complex curve measured to provide lens grinding information.

Another object of this invention is to provide means for locating the major and minor axes of the cornea so that a minimum number of photographs are necessary to provide lens grinding information.

Still another object of this invention is to compare a recorded image of the cornea to templates constructed with known compound or simple curves in order that contact lenses may be manufactured on the basis of comparison with the templates.

The present invention is also useful in measuring and recording the contour of contact lenses themselves and in the study of pathology of the eye.

There is some evidence supporting the theory that the contour of the individual cornea may change due to medication, physical stress, or simply the passage of time. The person measuring corneal curvatures is never quite certain whether such changes actually occur or whether one of two sets of measurements taken at different times is inaccurate. The permanent images obtained from this invention allow the determination of this question with certainty. Therefore, it is also an object of this invention to provide a record for such purposes and consequently improve on the process of fitting contact lenses.

Brief description of the drawings

FIG. 1 is a diagram showing various optical features of the apparatus;

FIG. 2 is a diagram showing the operator's view through the apparatus when the optical systems are in focus;

FIGS. 3a and 3b are diagrams showing the operator's view when using the axis locater system;

FIG. 6 is an elevational front view of the apparatus of FIG. 5 with the camera system in place; and FIG. 7 is an elevational side view of the apparatus of FIG. 5.

Description of the preferred embodiments

Figure 5:
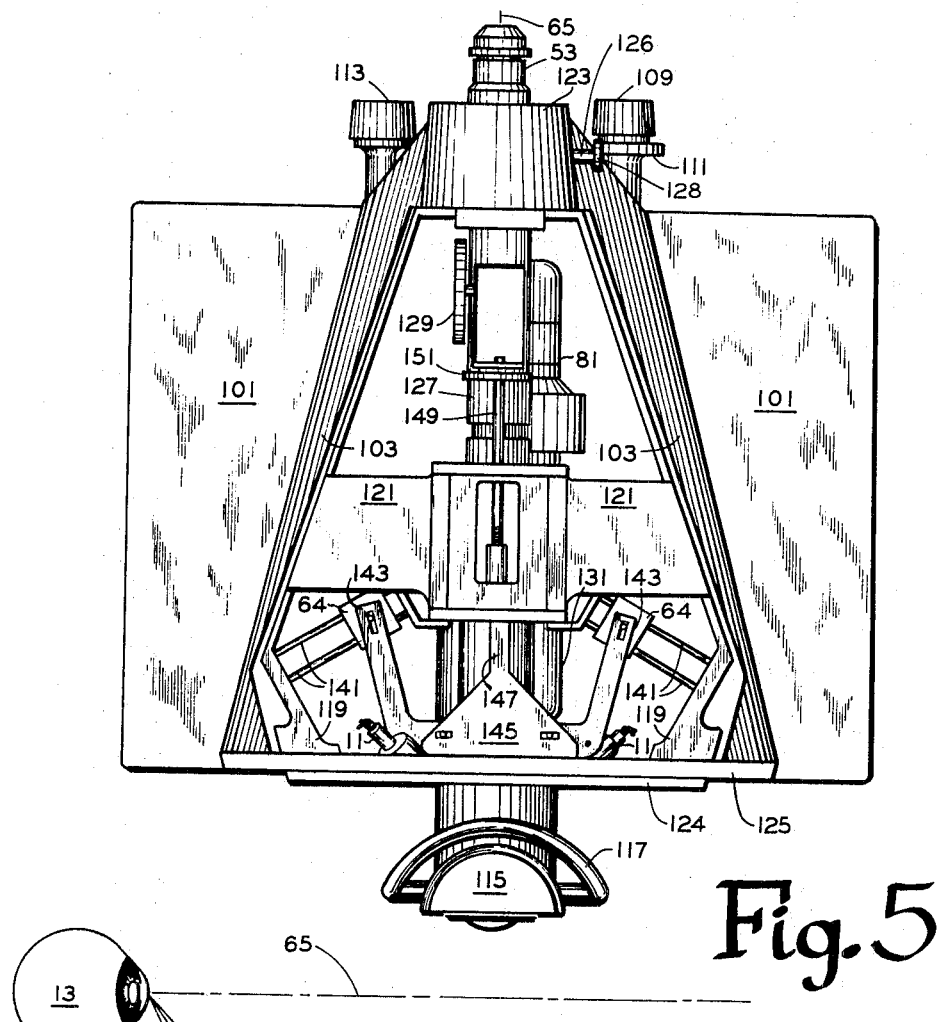
FIG. 5 is a plan view of an embodiment of the apparatus with the camera system removed.

In the drawings, the same reference numerals are applied to identical parts in all embodiments and such identically numbered parts are substantially equal in function and operation. Therefore to eliminate confusing duplication, these parts, their interrelationship and their function will be described in conjunction with a single embodiment, such description applying to all embodiments where these parts appear.

The apparatus of this invention should not be confused with other devices that depend on the specular reflection of light from the eye. Such apparatus has been tried with little success. This invention relies on the scattering of light from the cornea so that the image is not formed from the true reflected image. This approach (light scattering) makes it possible to use better viewing angles (and the light from the curved slit can be positioned on the central axis of the cornea) and to obtain better definition in the resulting image of the cornea.

Referring to FIG. 1, a source of light 11 (two are shown) provides modeling illumination for the patient's eye 13. The illuminated eye 13 is viewed through an opening 15 in mirror 17. The patient fixes his eye on the pattern 19 of the fixation reticle 21 in order to keep the eye 13 reasonably immobile. A side view image of the eye 13 is reflected by a series of mirrors 23, 25, 27, 29, and 31 to lens 33 which focuses the sideview image at reticle 35 after reflection from beam splitter 37. Lens 39 focuses an enlarged front view image of the eye 13 at reticle 35 and the light from lens 39 passes through axis corrector plate 41 (which corrects the refraction occurring at beam splitter 37) before reaching the reticle 35. Reticle 35 includes a cross hair 43. A plurality of lenses then focuses the combined beam 45 (front view and side view) for the observor or operator 47. The plurality of lenses includes two objective lenses 49 and 51 and an eyepiece 53 made up of a plurality of lenses 55—55. The eyepiece 53 is preferably a plano-convex of about 18–20 × although the invention should not be restricted to this particular selection.

All of the optical system, including those portions to be described subsequently, are focused upon the eye 13 by a triangulation system included in the front and side view portions of the optical system just previously described. FIG. 2 shows the operator's view from the eyepiece during focusing and alignment. The front view of the eye 13 is shown in broken lines where the outer circle 57 is the iris and the inner circle 59 is the pupil. The chin rest is first adjusted to bring the horizontal portion of cross hair 43 across the center of the pupil 59. The entire optical system is then moved laterally to bring the vertical section of cross hair 43 across the center of the pupil 59. The side view 61 of the eye 13 is smaller than the front view. The entire optical system is then moved toward and away from the eye 13 and the side view 61 moves across the viewing field in a manner shown by the double headed arrow 63 (although shown horizontally for convenience the arrow 63 could be at any angle depending upon the position of the entire optical system which is rotatable about the central axis 65). The forward and backward adjustment is made until the side view 61 is adjusted to a preselected point such as having the image of the iris 57 just touching the vertical portion of cross hair 43 and the horizontal portion of cross hair 43 centered in the pupil 59 (usually the cornea is not visible at this time). When the two views are aligned with the cross hairs 43, the entire optical system of the apparatus is in focus, including the curved thin line of light projecting portion and camera to be described subsequently.

After alignment and focusing the axis locaters 64—64 are used. The modeling lights 11—11 are switched off and the axis locater lights 66—66 are turned on. Axis locater lights 66—66 are preferably enclosed in boxes 67—67 and illuminate a selected target design 69 which is projected onto the cornea and reflected through the front view optical system. The axis locaters 64—64 are moveable toward and away from central axis 65 as indicated by the double headed arrows 71—71. The reflected images of targets 69—69 are doubled for the viewer by a Wollastan prism 73 which is a part of the axis locater system. The prism 73 is moveable in line with and off of the central axis 65 as indicated by double headed arrow 75. The prism 73 is in the position shown in FIG. 1 when the axis locater is being used.

One simplified type of a target for the axis locater system is shown in the view as seen by the operator (FIGS. 3a and 3b). The central dark portion of FIGS. 3a and 3b is the pupil 59 surrounded by the iris 57. The specific targets selected for illustration include two illuminated squares 77—77 separated by a dark line 79. The axis locaters 64—64 are adjusted (as indicated by the arrows 71—71) until the images of the two center targets appear to touch one another. There are four images but the operator is concerned with only the two center images. By rotating the optical system around the central axis 65 the images will be seen to move slightly in and out of line and they are shown out of alignment in FIG. 3a. When the black lines at the center of both squares are lined up to form a straight line, as shown in FIG. 3b, the image is aligned on the astigmatic axis. The angle is noted by a pointer and protractor ring (not shown) and is recorded. A photograph of the cornea is made in this position and then the opposite axis is determined in the same manner and the cornea photographed again.

After an axis has been located, the operator is ready to photograph the cornea. With the optical system locked at the proper angle, the operator simultaneously trips the flash 81 and the shutter (not shown) of camera lens 83. The light from the flash 81 passes through a condenser lens 87 and illuminates a curved slit 89 which is shaped to produce a thin curved line of light at the cornea and the curved line approximates the curvature of the average cornea. This is quite necessary to ensure that a thin sharp line of light is projected over the corneal curvature thereby eliminating fuzzy ends or a fuzzy central section. The image of the curved slit passes through objective lens 91, is reflected by mirror 93 through focusing lens 95 and projected onto the cornea by mirror 17. The image of the illuminated cornea passes to mirror 97, through wide angle lens 83 to film 99. The optics of the camera system are arranged so that the image of the cornea is effectively projected to the film at an angle of 90° to the axis 65.

Figure 4:
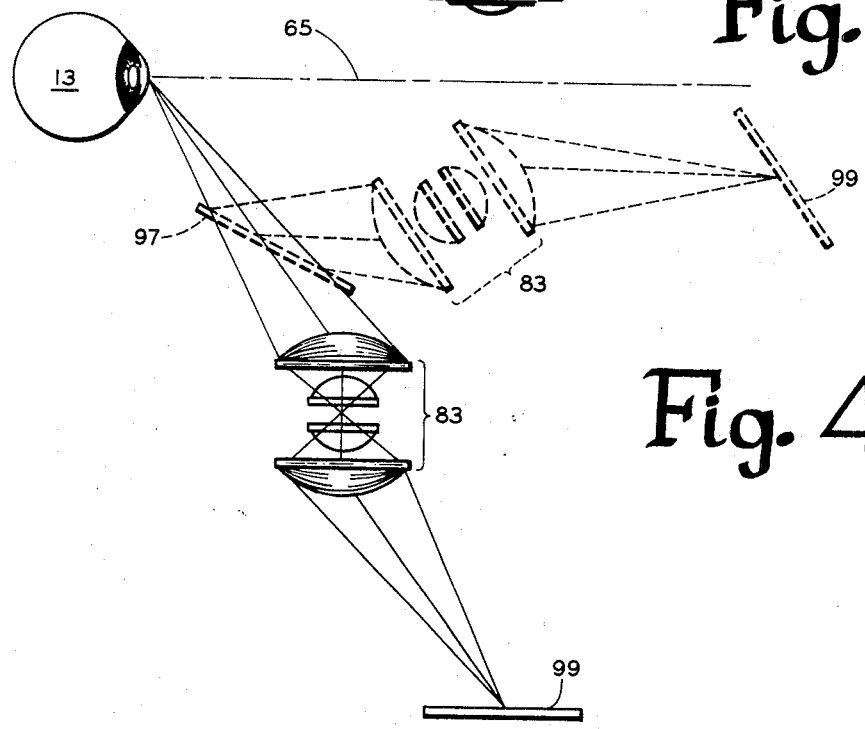
FIG. 4 is a diagram showing the ninety degree projection for the camera and mirror-folding of the projection to conserve space in the apparatus.

FIG. 4 is a diagram illustrating the 90° projection of the image reflected from the cornea at an angle measurably less than ninety degrees from the axis 65. The solid lines show how a point on the cornea is projected through the wide angle lens 83 to the film 99. The broken lines show how the projection is folded by mirror 97 in the actual embodiment of the apparatus and brought closer to the optic axis 65 in order to conserve space in the apparatus. After insertion of the mirror 97, the wide angle lens 83 and the film 99 are moved to the position shown by the broken lines.

It should be noted that the angular relationships of the various positions of the apparatus shown in FIG. 1 are not intended to be accurate. A line passing through he axis locaters 64—64 is actually parallel to a line through the plane that includes the curved slit and both are perpendicular to a line perpendicular to the central axis 65 and passing through the axis of the camera. Also it should be noted, that in practice (since the cornea is not clearly visible in the front and side view optical systems) the front view system and side view system focus essentially on the iris to bring all systems (except perhaps the very fine focus of the axis locater which uses the front view system) into focus and that there may be a slight focus adjustment upon using the axis locater system (since it is reflected from the cornea) followed by a slight refocusing adjustment when switching back to the camera for recording a meridian of the cornea. In most instances, however, the focus of the axis locater system is sharp enough that additional focusing is unnecessary.

FIGS. 5, 6, and 7 are three views of a practical model using the optical features shown in FIGS. 1–4. A frame 101 having an upstanding saddle-shaped projection 103 is moveably mounted on a base plate 105 (shown in FIG. 6) having legs 107—107. The frame 101 (and saddle 103) can be moved horizontally either along or perpendicular to the central axis 65. The adjustment knob 109 is rotated for movement along axis 65 and is responsible for focusing. A fine adjustment wheel 111 is also included for sharp focusing (FIGS. 5 and 7). Another adjustment knob 113 (shown in FIG. 5) is rotated for movement perpendicular to the axis 65 and is partially responsible for centering the eye. A chin rest 115 and head rest 117 are supported on a pedestal 118 that is adjustable vertically by a centrally positioned adjustment knob (not shown) between adjustment knobs 109 and 113 and is also partially responsible for centering the eye.

A central rotatable frame 119 having cross members 121—121 supports the optical components and is rotatable within rear bearing 123 and attached to a front circular plate 124 that is rotatable within front bearing collar 125. A threaded stem 126, rotated by knob 128, passes through rear bearing 123 to engage the frame 119 within and act as a brake to hold the frame 119 in any selected position of rotation.

The frame 119 supports the central tube 127 that contains the front viewing optical system. A wheel 129 is connected to the prism 73 and rotation of the wheel 129 moves the prism 73 into and out of alignment with the central axis 65 as shown by the arrow 75 in FIG. 1. The flash 81 is connected to a tube 131 having a support mounting 133 connected between tube 131 and the frame 119. Tube 131 has a right angle and connects into tube 127. An access opening 135 is provided in tube 131 to allow adjustment of mirror 93. The camera (removed in FIG. 5 and shown in FIG. 7) has the lens 83 mounted in the face plate 124 and the camera tube 137 is connected to frame 119 by a support 139. The film pack holder 141 is mounted at the proper angle (depending on the angle of mirror 97) on camera tube 137. The side view system is not visible in any of the views of the three FIGS. 5, 6, and 7.

The axis locaters 64—64 are mounted on tracks 141—141 and each is pivotally connected to an arm 143 (FIG. 5). Each arm 143 is pivotally connected to a plate 145 having an extension 147 that threadedly engages shaft 149. Shaft 149 is rotated by manipulation of wheel 151 which causes plate 145 to move back and forth along the central axis 65 and in turn causes the axis locaters 64—64 to move toward and away from the central axis 65 as indicated by the arrows 71—71 in FIG. 1.

FIG. 6 shows the preferred arrangement of the front circular plate 124. The light sources 11—11 are mounted to illuminate the eye 13 through two openings 153—153. An opening 155 is provided for the side view optical system. The central opening is a wide slot 157 having a larger circular portion 159 at the center. The axis locaters 64—64 are visible through slot 157 and the end of tube 127 is visible in the circular opening 159. Preferably a transparent dust cover 161 is positioned over the end of tube 127. The opening 163 positioned on a line perpendicular to the long axis of slot 157 is for the camera system.

Several features of the invention should be emphasized. The front view and side view optical systems allow the operator to check the focus to a very fine adjustment completely through the recording or picture taking step. This is a distinct advantage over systems that first focus on a ground glass or imaging screen and then place a film in the camera since the operator may bump the apparatus and change a setting or the patient may move slightly while the film is being placed in the camera. By observation through the eyepiece, the operator can tell immediately when the focus has changed. Another feature is the axis locater in combination with the other optical parts of the apparatus. This reduces the number of pictures that the operator is required to take. Usually, the contact lens are ground on the basis of the curvatures along the major and minor axes. The operator only need take two pictures rather than a number of pictures and then compare them to observe the trends of the curvatures. Even after taking a number of pictures with conventional apparatus, there is no guarantee that any of them will be on the proper axes.

I claim:

1. Apparatus for recording the curvature of the cornea, comprising:
   (a) a light source;
   (b) a curved slit positioned with the convex portion nearest said light source, illuminated by said light source, said curved slit having a radius of curvature that, when an image of said curved slit is selectively focused on the cornea of the eye, substantially conforms to the curvature of the average cornea;
   (c) optical means for projecting and focusing an image of said curved slit onto the cornea of an eye properly positioned with respect to the apparatus, said optical means projecting said image of the curved slit along an axis perpendicular to the center region of the cornea; and
   (d) a camera for recording an image of the illuminated portion of said cornea reflected therefrom at an angle measurably less than ninety degrees from said axis, said camera including wide angle lens means positioned to project said image of the illuminated portion of the cornea to the film effectively at an angle of ninety degrees to said axis.

2. Apparatus for recording the curvature of the cornea, comprising, in combination:
   (a) a light source;
   (b) a curved slit illuminated by said light source, said curved slit having a radius of curvature that, when an image of said curved slit is selectively focused on the cornea of the eye, substantially conforms to the curvature of the average cornea;
   (c) optical means for projecting and focusing an image of said curved slit onto the cornea of an eye properly positioned with respect to the apparatus, said optical means projecting said image of the curved slit along an axis perpendicular to the center region of the cornea;
   (d) a camera for recording an image of the illuminated portion of said cornea, said camera including wide angle lens means positioned to project said image of the illuminated portion of the cornea to the film effectively at an angle of ninety degrees to said axis; and (e) triangulation means for centering and focusing the apparatus with respect to the eye, and means for linking said triangulation means with said optical means and said camera such that said optical means and said camera are in focus when said triangulation means is in focus.

3. Apparatus as in claim 2, wherein said triangulation means includes optical means for projecting a front view of the eye to an eyepiece, a cross hair positioned in said optical means for projecting a front view of the eye, and optical means for projecting a side view of the eye to said eyepiece, said triangulation means being in focus when the pupil of the eye in both views is centered on said cross hair.

4. Apparatus for locating and recording the curvature at the major and minor axes of the cornea, comprising, in combination:

(a) a first frame rotatably mounted on a second frame;
(b) a light source mounted on said first frame;
(c) a curved slit illuminated by said light source and mounted on said first frame, said curved slit having a radius of curvature that, when an image of said curved slit is selectively focused on the cornea of the eye, substantially conforms to the curvature of the average cornea;
(d) optical means for projecting and focusing an image of said curved slit onto the cornea of an eye properly positioned with respect to the apparatus, said optical means projecting said image of the curved slit along an axis perpendicular to the center region of the cornea and said optical means mounted on said first frame;
(e) a camera for recording an image of the portion of the cornea illuminated by said image of the curved slit, said camera including wide angle lens means positioned to project said image of the portion of the cornea illuminated by said image of the curved slit to the film effectively at an angle of substantially ninety degrees to said axis perpendicular to the center region of the cornea; and
(f) a major and minor axis locater means slideably mounted on said first frame, said major and minor axis locater means including at least two illuminated targets moveable toward and away from said axis perpendicular to the center region of the cornea and positioned to produce a reflected image of each of said at least two illuminated targets, one on each side of the center of said cornea, means for rotating said first frame for aligning the images of said illuminated targets when said image of the curved slit is in alignment along a major or minor axis of the cornea, the images of said targets being misaligned when said image of the curved slit is not aligned along a major or minor axis of the cornea.

5. Apparatus as in claim 4, comprising also:

(g) triangulation means mounted on said first frame for centering and focusing the apparatus with respect to the eye, and means for linking said triangulation means with said optical means and said camera such that said optical means and said camera are in focus when said triangulation means is in focus.

6. Apparatus as in claim 5, wherein said triangulation means includes optical means for projecting a front view of the eye to an eyepiece, a cross hair positioned in said optical means for projecting a front view of the eye, and optical means for projecting a side view of the eye to said eyepiece, said triangulation means being in focus when the pupil of the eye in both views is centered on said cross hair.

References Cited

UNITED STATES PATENTS

| | | | |
|---|---|---|---|
| 1,721,208 | 7/1929 | Currier et al. | 351—7 X |
| 2,999,422 | 9/1961 | Paprttz | 351—16 X |
| 3,108,523 | 10/1963 | Nuchman et al. | 351—7 X |
| 3,141,396 | 7/1964 | Kimball et al. | 351—7 X |

FOREIGN PATENTS

| | | |
|---|---|---|
| 28,445 | 12/1912 | Great Britain. |

OTHER REFERENCES

Robt. B. Mandell, "Profile Methods of Measuring Corneal Curvature," J. Amer. Optom. Assoc., vol. 32, No. 8, March 1961, pp. 627–631.

C. M. Taylor, "Outlining Corneal Contour," The Optician, vol. 145, No. 3764, pp. 503–505.

DAVID SCHONBERG, Primary Examiner

P. A. SACHER, Assistant Examiner

U.S. Cl. X.R.
351—1, 7, 13, 16